(12) United States Patent
Kerr et al.

(10) Patent No.: US 9,496,699 B2
(45) Date of Patent: Nov. 15, 2016

(54) RECESS CAN ADAPTER BRACKET

(71) Applicants: Jack Kerr, Hearne, TX (US); Stefano Caposecco, Cinnaminson, NJ (US)

(72) Inventors: Jack Kerr, Hearne, TX (US); Stefano Caposecco, Cinnaminson, NJ (US)

( * ) Notice: Subject to any disclaimer, the term of this patent is extended or adjusted under 35 U.S.C. 154(b) by 2 days.

(21) Appl. No.: 13/888,440

(22) Filed: May 7, 2013

(65) Prior Publication Data

US 2013/0320165 A1 Dec. 5, 2013

Related U.S. Application Data

(60) Provisional application No. 61/654,836, filed on Jun. 2, 2012.

(51) Int. Cl.
*F16M 13/00* (2006.01)
*H02G 3/14* (2006.01)
*F16M 13/02* (2006.01)
*H02G 3/20* (2006.01)
*F21V 21/04* (2006.01)

(52) U.S. Cl.
CPC ............ *H02G 3/14* (2013.01); *F16M 13/027* (2013.01); *F21V 21/04* (2013.01); *H02G 3/20* (2013.01)

(58) Field of Classification Search
USPC ................. 248/342, 343, 344, 906, 200.1
See application file for complete search history.

(56) References Cited

U.S. PATENT DOCUMENTS

| | | | | |
|---|---|---|---|---|
| 5,242,269 | A * | 9/1993 | Chang ................. | 416/244 R |
| 5,934,631 | A * | 8/1999 | Becker et al. ......... | 248/200.1 |
| 6,790,008 | B1 * | 9/2004 | Huang ................. | 416/244 R |
| 8,076,575 | B1 * | 12/2011 | Gretz ................... | 174/50 |
| 8,517,325 | B2 * | 8/2013 | Verma et al. .......... | 248/342 |
| 2006/0278766 | A1 * | 12/2006 | Wang .................. | 248/74.1 |

* cited by examiner

*Primary Examiner* — Steven Marsh
(74) *Attorney, Agent, or Firm* — Michael Diaz

(57) ABSTRACT

An adapter for a recess can. The adapter includes a hangar bar having a first section slidably connected to a second section. The hangar bar has a first end mount on a first end and a second end mount on a second opposite end of the hangar bar. The adapter also includes a clamping mechanism sized and shaped to fit within a slot of the hangar bar. The clamping mechanism holds the first section stationary in relationship to the second section. The adapter also includes an adapter bracket attachable to the hangar bar. The end mounts are attached to a wall of the recess can and a fixture bracket is attached to the adapter bracket for supporting a fixture.

9 Claims, 9 Drawing Sheets

RECESS CAN ADAPTER BRACKET

This utility application claims the benefit of U.S. Provisional Patent Application Ser. No. 61/654,636 filed Jun. 2, 2012 by Jack R. Kerr which is hereby incorporated by reference.

BACKGROUND OF THE INVENTION

Field of the Invention

This invention relates to support assemblies. Specifically, and not by way of limitation, the present invention relates to an adapter for a recess can in a recessed ceiling configuration.

Description of the Related Art

In many homes, recessed ceiling lighting fixtures are very common. A light bulb is located in a "housing" or "can" where its lower portion is flush or slightly below the ceiling. These lighting fixtures are also known as "can fixtures" or "recess cans".

FIG. 1 is illustrates an existing recess lighting fixture 10. The fixture includes a circular can 12 and a socket 14. The can includes a circular wall 16 and a rim 18 lying flush against a ceiling 20. A light bulb is typically screwed into the socket 14 which is coupled to wiring leading to electrical power source.

However, these existing recess lightning fixtures suffer from some disadvantages. Because of the structure of the cans, other fixtures are unable to be hung from the cans. For example, fan light fixtures are not able to be hung from the recess cans as they do not have adequate support from the recess cans. These recess lighting fixtures lack a flexibility to support other lighting fixtures such as fan lighting fixtures, hanging lighting fixtures, etc.

Thus, it would be advantageous to have an adapter which enables existing recess cans to be modified to support other lighting fixtures. It is an object of the present invention to provide such an apparatus.

SUMMARY OF THE INVENTION

In one aspect, the present invention is an adapter for a recess can. The adapter includes a hangar bar having a first section slidably connected to a second section. The hangar bar has a first end mount on a first end and a second end mount on a second opposite end of the hangar bar. The adapter also includes a clamping mechanism sized and shaped to fit within a slot of the hangar bar. The clamping mechanism holds the first section stationary in relationship to the second section. The adapter also includes an adapter bracket attachable to the hangar bar. The end mounts are attached to a wall of the recess can and a fixture bracket is attached to the adapter bracket for supporting a fixture.

In still another embodiment, the present invention is a can converter bracket for a recess can. The bracket includes a non-adjustable C-channel bracket having at least two legs affixed to a wall of the recess can. In addition, the bracket includes a cross bar mounting bracket affixed to a top portion of the C-channel bracket. The cross bar mounting bracket has two ends adapted to support a fixture bracket for a fixture. In addition, the cross bar mounting bracket may rotate about the C-channel bracket.

DESCRIPTION OF THE INVENTION

Figure 1:
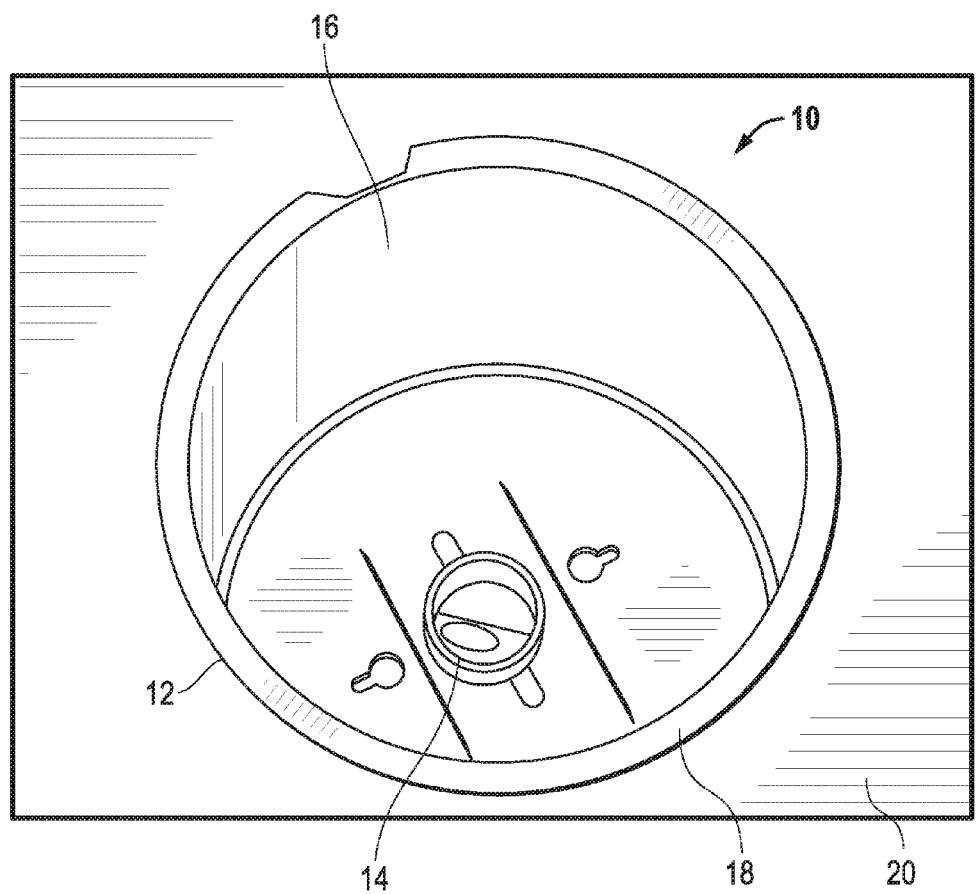
FIG. 1 (prior art) is a photograph of an existing recess lighting fixture.
Figure 2:
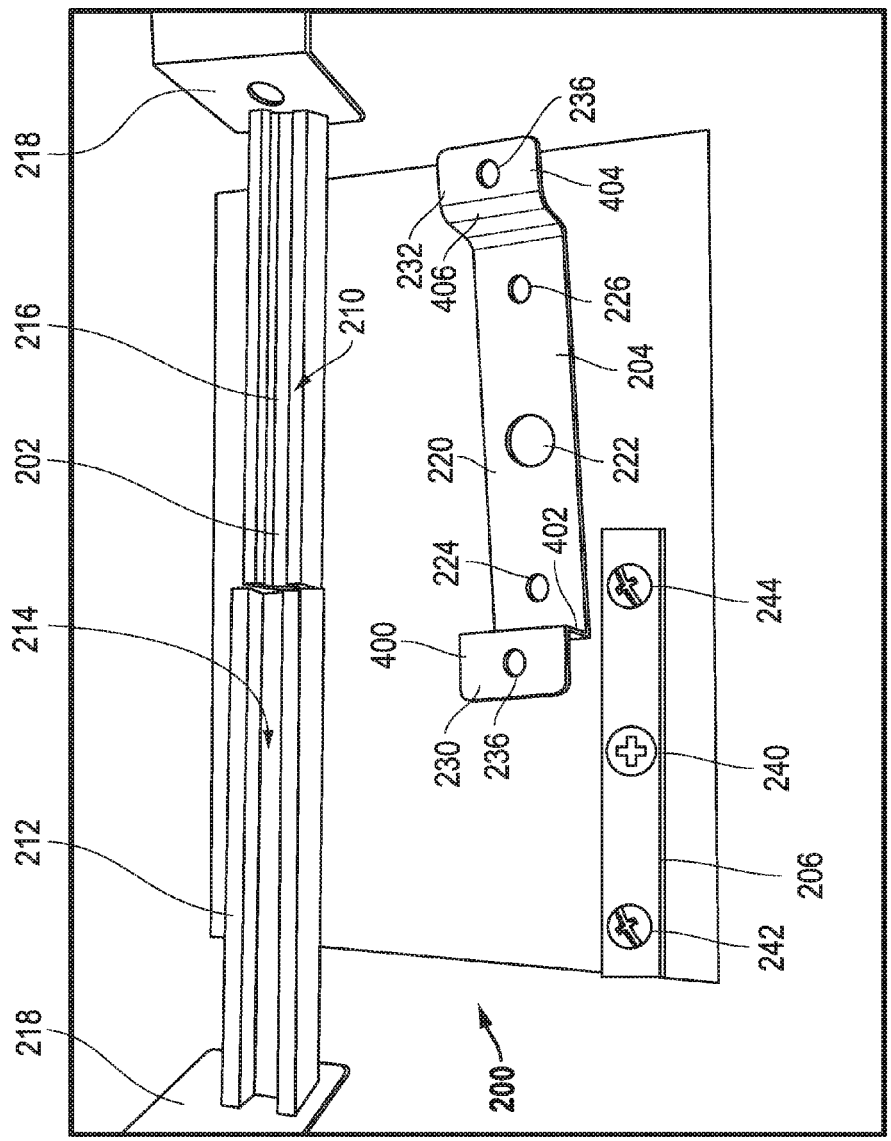
FIG. 2 is a top view of separated components of a modification kit in another embodiment of the present invention.

The present invention is an adapter for a recess can lighting xture to enable support of other lighting fixtures. In one embodiment, a hangar bar may be utilized for modifying the existing recess can 12. FIG. 2 is a top view of separated components of a modification kit 200 in another embodiment of the present invention. The modification kit includes a hangar bar 202, an adapter bracket 204, and a clamping mechanism 206. The hangar bar 202 is a telescopically extending main section 210 having a first section 212 sized and shaped to fit and slide within a slot 214 of a second section 216. Each section includes an end mount 218. The adapter bracket 204 includes a main section 220 having a central opening 222 and two holes 224 and 226. Additionally, the adapter bracket includes two upraised ends 230 and 232, each having holes 236. The clamping mechanism 206 includes a central screw 240 and two end screws 242 and 244. The upraised end 230 includes a foot 400 connected to the main section 220 by a connector 402. The upraised end 232 includes a foot 404 connected to the main section 220 by a connector 406. The foot 400 and the foot 404 are each aligned parallel to the main section which the connectors 402 and 406 are aligned perpendicular to the main section and each foot.

Figure 3:
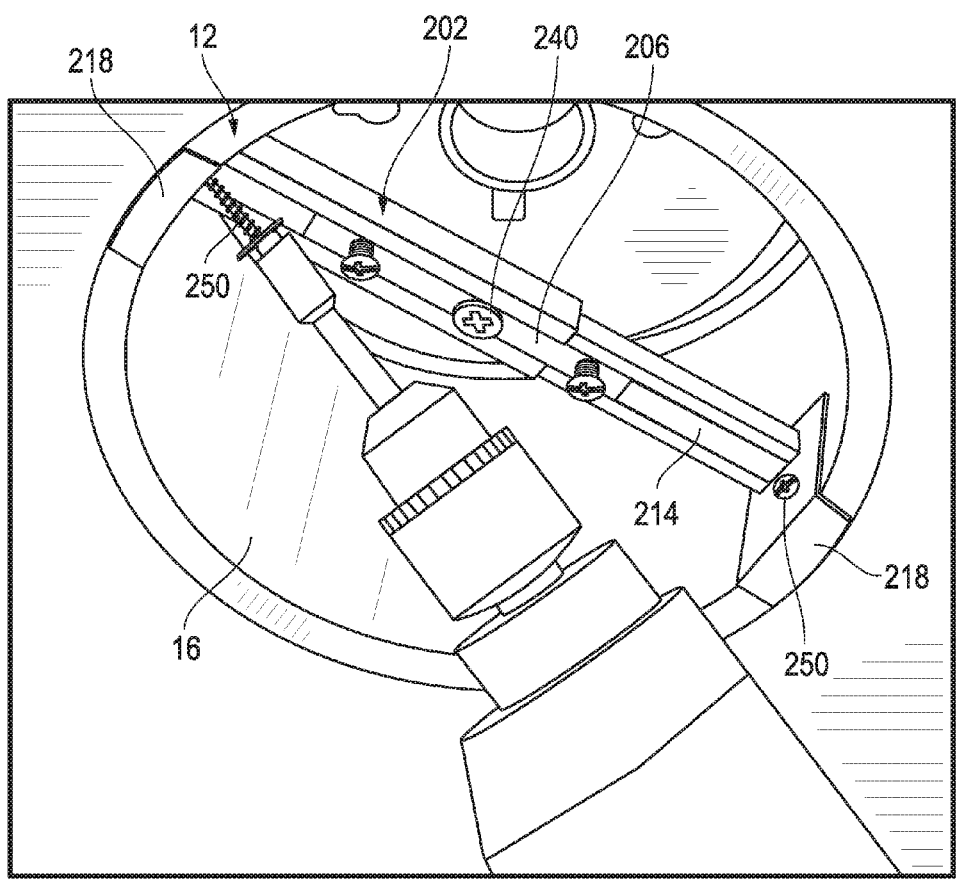
FIG. 3 is a bottom view of the hangar bar being installed within the recess can.

FIG. 3 is a bottom view of the hangar bar 202 being installed within the recess can 12. The clamping mechanism 206 is positioned within the slot 214 of the hangar bar 202. The hangar bar is telescopically extended so that the end mounts 218 are positioned adjacent the can wall 16. Self-tapping screws 250 may be used to affix the end mounts 218 to the wall. When installing the hangar bar, the hangar bar is positioned with the can and the first section 212 and second section 214 are extended until the end mounts 218 apply pressure to the wall 16. The hangar bar is held in the extended position by tightening the screw 240 of the clamping mechanism 206. In this position, the end mounts apply sufficient pressure to the wall 16 that the hangar bar is held in place. Thus, during the process of drilling the screws 250 into the can wall, the user does not need to hold the hangar bar.

Figure 4:
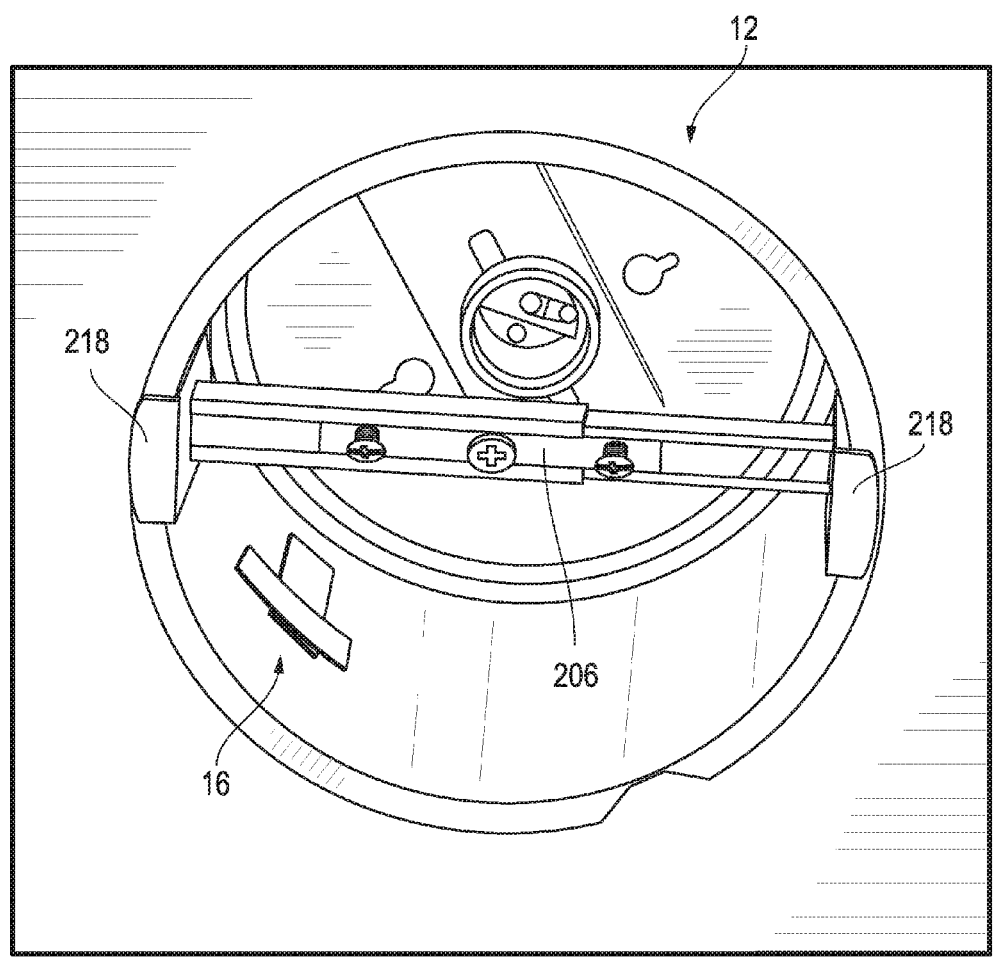
FIG. 4 is a bottom view of the hangar bar fully installed and attached to the recess can.

FIG. 4 is a bottom view of the hangar bar 202 fully installed and attached to the recess can 12. The end mounts 218 are attached by the screws 250 to the wall of the can.

Figure 5:
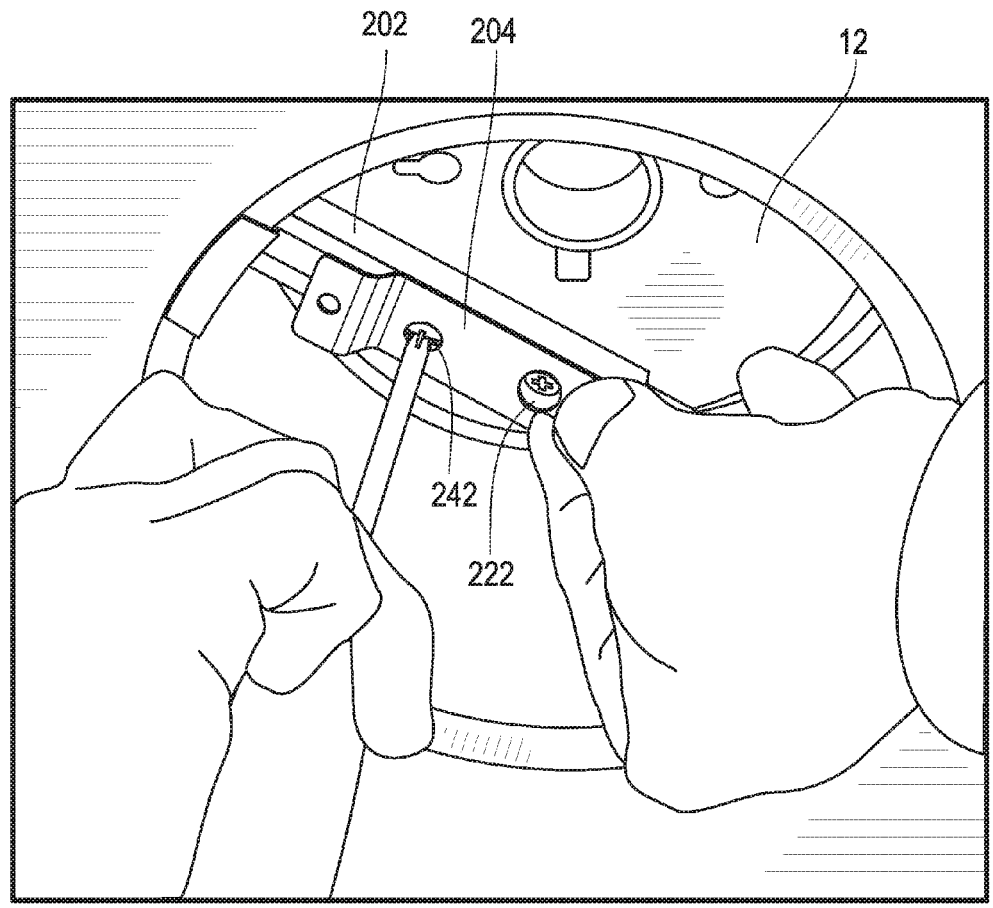
FIG. 5 is a bottom view of the adapter bracket being installed on the clamping mechanism.

FIG. 5 is a bottom view of the adapter bracket 204 being installed on the clamping mechanism 206. The screws 240, 242, and 244 are positioned with the holes of the adapter bracket and screws 242 and 244 are used to affix the adapter bracket to the clamping mechanism and hangar bar.

Figure 6:
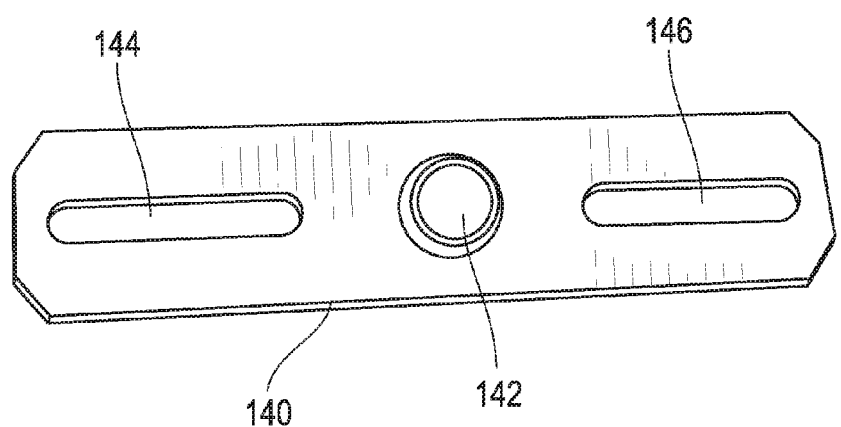
FIG. 6 (prior art) is a top view of an existing light fixture bracket

FIG. 6 is a top view of an existing light fixture bracket 140. The bracket 140 includes a central opening 142 and two opposing slots 144 and 146. Screws 152 may be used for affixing the bracket to the adapter through the slots 144 and 146 to the openings 150 (see FIGS. 2-5) of the adapter plate. A light fixture may then be affixed to the light fixture bracket through the slots 144 and 146 or through central opening 142.

Figure 7:
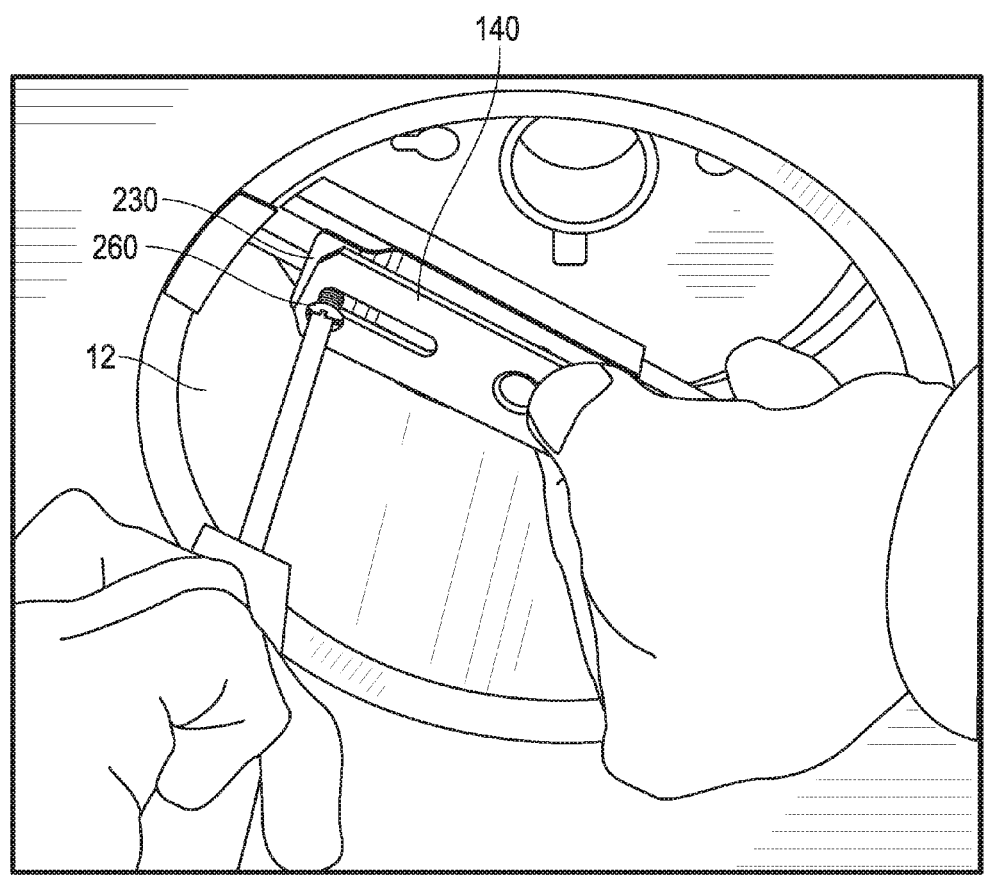
FIG. 7 is a bottom view of the fixture bracket being attached to the adapter bracket.
Figure 8:
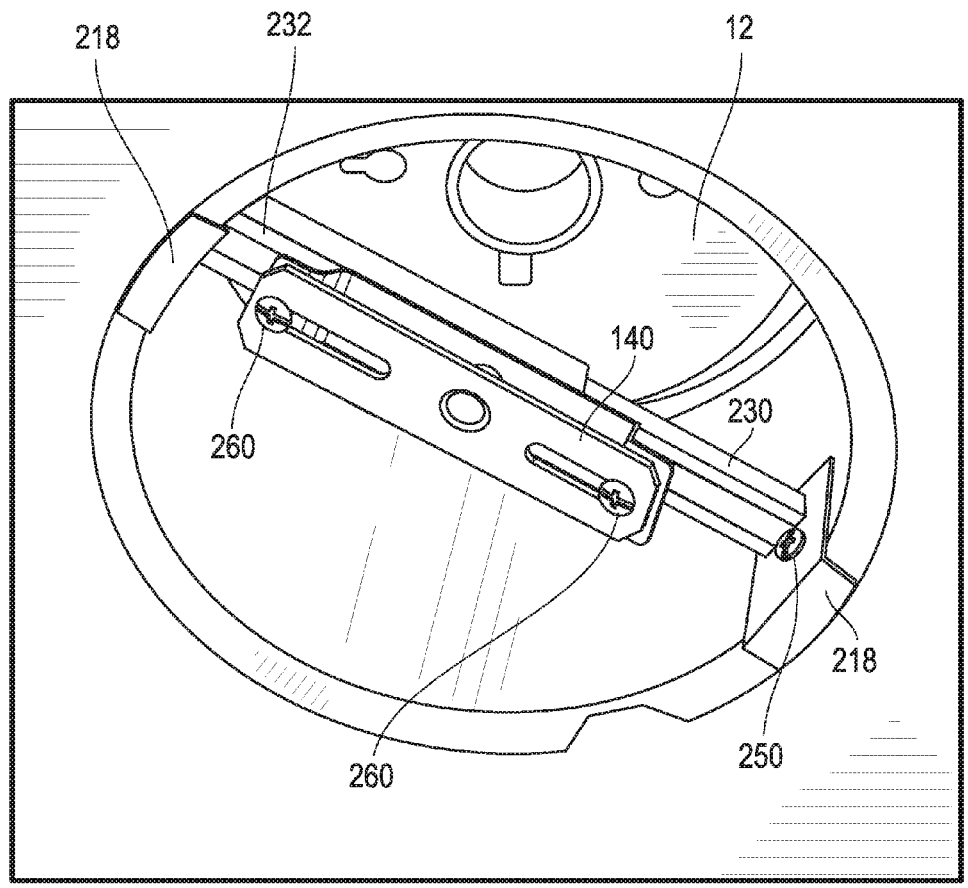
FIG. 8 is a bottom view of the fixture bracket attached to the adapter bracket within the recess can.

FIG. 7 is a bottom view of the fixture bracket 140 being attached to the adapter bracket 204. Screws 260 may be affixed through the adapter bracket and the holes 236 of the ends 230 and 232. Fixtures may then be affixed to the bracket and modification kit 200 attached to the can 12. FIG. 8 is a bottom view of the fixture bracket 140 attached to the adapter bracket 204 within the recess can 12.

With reference to FIGS. 1-8, the operation of the second embodiment (modification kit 200) will now be explained. First, the clamping mechanism 206 is inserted within the slot 214 of the hangar bar 202. The hangar bar 202 is extended so that the end mounts 218 are touching the wall 16 of the recess can 12. The end mounts 218 position the kit 200 at the correct height/position in reference to rim 18 of can 12. The mounts apply enough force against the wall in order to hold the hangar bar in place when screwing screws through the end mounts 218 into the wall 16 of the recess can. The extended position of the hangar bar is held in place by tightening screws 240 of the clamping mechanism. When the screws are screwed through the wall, the hangar bar is held in place and capable of supporting weight of a fixture. Next, the adapter bracket 204 is attached to the hangar bar 202 by using the screws 242 and 244. Next, the fixture bracket 140 is attached to the ends 230 and 232. A fixture may then be attached to the fixture bracket 140.

Figure 9:
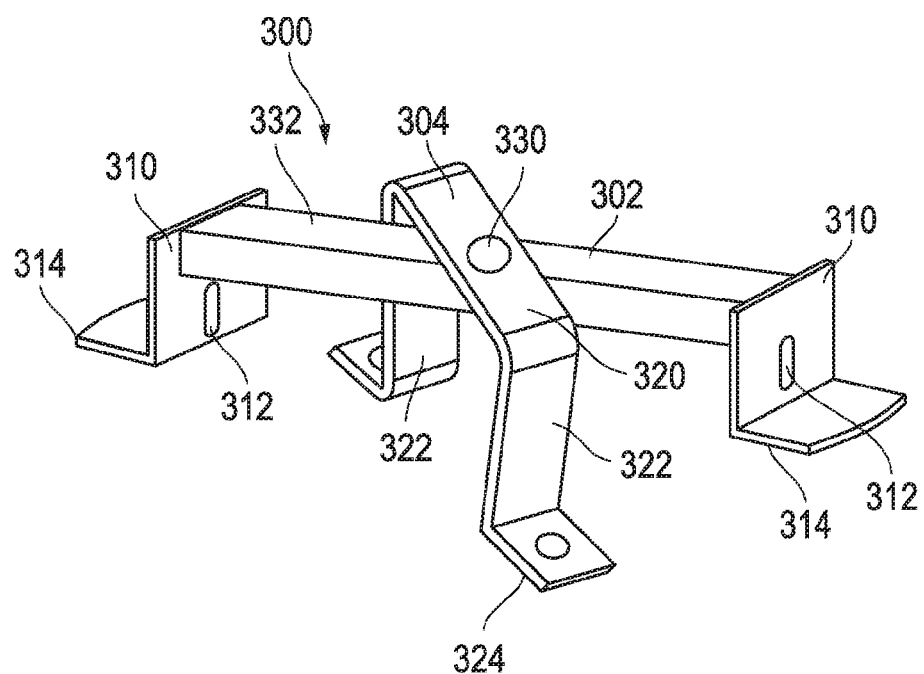
FIG. 9 is front perspective view of a can converter bracket in another embodiment of the present invention.

The present invention may also use a non-adjustable can converter bracket in another embodiment of the present invention. FIG. 9 is front perspective view of a can converter bracket 300 in another embodiment of the present invention. In this embodiment, the bracket 300 includes a non-adjustable C-channel bracket 302 and a cross bar mounting bracket 304. The C-channel bracket is sized and shaped to fit a particular size can (e.g., one bracket is sized for 6 inch cans, another would be for five inch cans, etc.). The bracket 302 is stamped and fixed in the shape of a "C". The bracket 302 includes legs 310 having holes 312, each having a foot extension 314. The cross bar mounting bracket 304 includes a main section 320, and two extensions 322, each having an opening 324. The cross bar mounting bracket 304 is attached by a rivet/swedge 330 to a top side 332 of the bracket 302. The cross bar mounting bracket can rotate approximately 110 degrees for ease of installation. The legs 310 of the bracket 302 are attached with screws to the wall 16 of the can 12. The foot extensions 314 rest upon the rim 18 of the can 12. The foot extensions 314 position the kit 200 at the correct height/position in reference to rim 18 of can 12.

Figure 10:
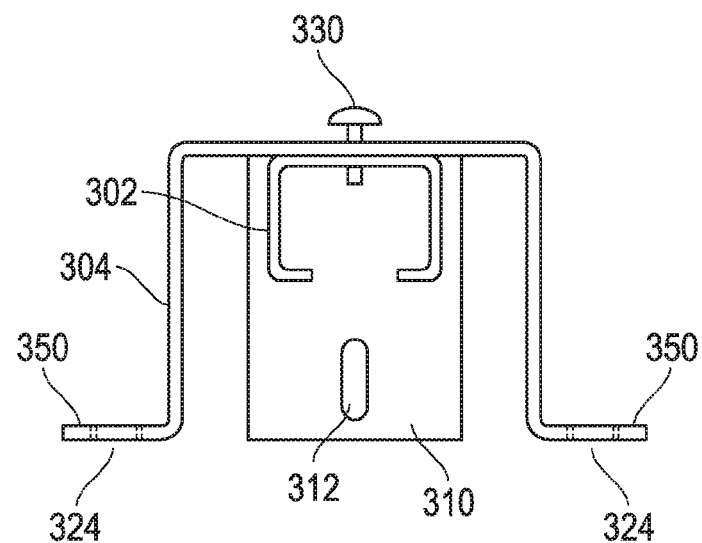
FIG. 10 is a side view of the bracket.

FIG. 10 is a side view of the bracket 300. Each extension 322 includes a planar end 350 having the opening 324. A fixture or fixture bracket may be attached to the ends 350.

With reference to FIGS. 9 and 10, the operation of the bracket 300 will now be explained. The bracket 302 is positioned to rest within the can 12 with the legs 310 adjacent the wall 16. Screws are used to affix the bracket 302 to the wall of the can 12. The mounting bracket 304 may be rotated as necessary for ease of installation of the fixture (not shown). The fixture is affixed to the mounting bracket 304 using screws through the holes 324 of the ends 350.

In one embodiment for kit 200 as well as bracket 300, a metal cover plate and a decorative medallion (both not shown) may be mounted over the recess can opening. The cover plate and decorative medallion may be installed after the light fixture bracket is installed and electrical connections are made. In this embodiment, the cover plate, decorative medallion, and a fixture canopy may be attached over the recess can using threaded studs/mounting screws mounted on the light fixture bracket. Although the present invention discussing using the existing light fixture bracket 140 shown in FIG. 6, the present invention may be utilized with any light fixture bracket and is not limited to the size, form, or configuration illustrated in FIG. 6.

The present invention provides a system and method of enabling recessed lighting cans to be utilized for holding other types of light and fan fixtures. The present invention is easy to install and enables the user to select different fixtures for attachment.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An adapter for a recess can, the adapter comprising:
a hangar bar having a first section slidably connected to a second section for telescopically extending the hangar bar, the hangar bar having a first end mount on a first end and a second end mount on a second opposite end of the hangar bar;
a clamping mechanism holding the first section of the hangar bar stationary in relationship to the second section of the hangar bar;
an adapter bracket attachable to the hangar bar having a main section with a first upraised end and a second upraised end;
wherein the first and second ends of the adapter bracket are raised above the main section of the adapter bracket;
wherein the first upraised end includes a first foot having a first hole and being aligned parallel to the main section and a first connector affixed and aligned perpendicular to the main section and the first foot;
wherein the second upraised end includes a second foot having a second hole and being aligned parallel to the main section and a second connector affixed and aligned perpendicular to the main section and the second foot;
wherein the first end mount and second end mount are configured for attaching to a wall of the recess can; and
a fixture bracket attached to the adapter bracket for supporting a fixture, the fixture bracket having a first end with a first opening and a second end opposite the first end with a second opening;

wherein the first foot of the first upraised end is configured to contact the first end of the fixture bracket and the second foot of the second upraised end is configured to contact the second end of the fixture bracket, the first hole of the first foot aligns with the first opening of the fixture bracket and the second hole of the second foot aligns with the second opening of the fixture bracket.

2. The adapter according to claim 1 wherein the clamping mechanism is sized and shaped to fit within a slot of the hangar bar.

3. The adapter according to claim 2 wherein the clamping mechanism includes a clamp screw to tighten the clamping mechanism and prevent longitudinal movement of the first and second sections.

4. The adapter according to claim wherein screws are affixed through the end mounts to a wall of the recess can.

5. The adapter according to claim wherein the adapter bracket is attached to the hangar bar with screws.

6. The adapter according to claim 1 wherein the hangar bar is extendible to various lengths to accommodate a plurality of recess cans of various diameters.

7. The adapter according to claim 1 wherein the first and second ends of the adapter bracket are raised above the main section of the adapter bracket to provide sufficient room to accommodate a mounting bracket for a fixture between the adapter bracket and the hanger bar.

8. The adapter according to claim 1 wherein the first hole of the first foot and the second hole of the second foot are configured for holding a fixture or a mounting bar.

9. The adapter according to claim 1 further comprising:
a first screw for insertion through the first opening of the fixture bracket and the first hole of the first foot; and
a second screw for insertion through the second opening of the fixture bracket and the second hole of the second foot, thereby affixing the fixture bracket to the first and second upraised ends of the adapter bracket.

\* \* \* \* \*